United States Patent [19]
Dunshee

[11] 3,961,980
[45] June 8, 1976

[54] PRODUCTION OF POWDERED SUCROSE:DEXTROSE BLENDS

[75] Inventor: Bryant R. Dunshee, St. Paul, Minn.

[73] Assignee: General Mills, Inc., Minneapolis, Minn.

[22] Filed: Aug. 5, 1974

[21] Appl. No.: 494,675

[52] U.S. Cl. .................. 127/30; 127/63; 426/572; 426/659
[51] Int. Cl.² ............... A23G 3/00; C13K 13/00
[58] Field of Search ............ 127/30, 63, 572; 426/213, 214, 659

[56] References Cited
UNITED STATES PATENTS

| | | | |
|---|---|---|---|
| 1,551,175 | 8/1925 | Schneller | 127/30 |
| 2,106,762 | 2/1938 | Robinson | 127/30 |
| 2,199,887 | 5/1940 | Lund | 127/30 |
| 2,297,764 | 10/1942 | Holven | 426/659 |
| 2,824,808 | 2/1958 | Gillett | 127/30 |
| 3,652,298 | 3/1972 | Mickevicz | 127/30 |
| 3,676,155 | 7/1972 | Horn | 426/659 |
| 3,874,924 | 4/1975 | Sands | 127/63 X |

*Primary Examiner*—Morris O. Wolk
*Assistant Examiner*—Sidney Marantz
*Attorney, Agent, or Firm*—Gene O. Enockson

[57] ABSTRACT

Mixture of dextrose monohydrate and sucrose in a weight ratio, respectively, of about 1:99 to 50:40 is ground to produce a blend wherein no more than about 1.5% of the particles are retained on a U.S. No. 200 Standard Screen. The sugar blend is useful in food products such as frostings and puddings.

5 Claims, No Drawings

PRODUCTION OF POWDERED SUCROSE:DEXTROSE BLENDS

The present invention relates to the preparation of finely ground or powdered blends of sucrose and dextrose monohydrate and to the resulting blends.

Dextrose monohydrate cannot be practically finely ground alone as it accumulates excessively on the grinding surfaces or requires drastic power increases. The finest particle size of dextrose monohydrate commercially available is obtained by selective screening. Even then the particle size is far coarser than that of powdered sucrose or confectioners sugar. This coarseness of dextrose monohydrate limits its application in such products as frostings and puddings where the coarser particles are readily detectable by mouthfeel and visual effect.

The following table shows comparative screen analyses of commercially available coarse dextrose monohydrate, fine dextrose monohydrate and powdered sugar (sucrose):

| Screen Analysis | Coarse[1] Dextrose.H$_2$O % | Fine[2] Dextrose.H$_2$O % | Powdered[3] Sucrose % |
|---|---|---|---|
| On U.S. No. 50[4] | 5 | Trace | 0 |
| On U.S. No. 80 | 32 | 1 | 0 |
| On U.S. No. 100 | 49 | 2 | 0 |
| On U.S. No. 200 | 82 | 16 | Trace |
| On U.S. No. 230 | 89 | 26 | 2 |
| On U.S. No. 325 | 95 | 44 | 5-6 |

[1]Cerelose 2001
[2]Staleydex 111
[3]Contained 4% wheat starch
[4]Standard Screen Sizes I have now discovered that by grinding dextrose monohydrate simultaneously with granular sucrose, a mixture or blend of sucrose and dextrose monohydrate can be obtained which has essentially the same particle size as powdered sucrose, thus eliminating the objectionable texture effect of the coarse dextrose monohydrate. The resulting blends can be used in a wide variety of food products and especially in frostings and puddings.

The granular sucrose and dextrose monohydrate are either blended together prior to passage through a suitable grinder or may be fed simultaneously to the grinder as separate streams. Any of the conventional grinders used in sugar processing can be used. Representative thereof are the ACM-MicroPulverizer, Raymond Mill, etc. Additionally, wheat or corn starch at levels of about 1 to 5% may optionally be added to minimize subsequent caking of the ground product during storage. It is here noted that starch addition is common in the usual procedure for powdered sucrose production.

While a range of sucrose-dextrose monohydrate ratios can be employed in the process, the amount of dextrose monohydrate is desirably maintained below about 50% by weight of the blend. The particle size reduction becomes somewhat less efficient much above 50% by weight dextrose monohydrate and a significantly higher amount of coarse material is found via screen analysis. The preferred range is from about 1 to 50% dextrose monohydrate or a weight ratio of about 1:99 to 50:50 dextrose monohydrate:sucrose. For usage in frosting mixes, a ratio of dextrose monohydrate:sucrose of about 35:65 is about as high as desirable due to a reduction in the level of sweetening available.

The regular sucrose employed in the present invention is readily commercially available from a number of sources. In the Example to follow, the granular sucrose had the following particle size range: 66% retained on U.S. No. 50; 96% retained on U.S. No. 80; and 100% retained on U.S. No. 100 (all standard screen sizes). The dextrose monohydrate employed can be any of the products conventionally available with a coarser particle size than can be achieved by the present invention. In this latter respect, the blends of the invention meet the requirement that no more than about 1.5% of the particles thereof are retained on a U.S. No. 200 Standard Screen.

The following Example serves to illustrate preferred embodiments of the invention without being limiting:

EXAMPLE

Pre-blends of sucrose and dextrose monohydrate were made up in the following weight ratios: 80:20; 72:28; 65:35; and 50:50. The dextrose monohydrate used was Cerelose 2001. In each case, 4.0% by weight wheat starch was mixed into the pre-blends prior to the grinding operation. The grinding was carried out in a Raymond Mill operating at a peripheral speed of 25,000 ft./min. The ground products were then subjected to screen analysis and the results are set forth in the following table:

| Screen Analysis | Blends (sucrose:dextrose monohydrate) | | | |
|---|---|---|---|---|
| | 80:20 % | 72:28 % | 65:35 % | 50:50 % |
| On U.S. No. 200[1] | 0 | Trace | Trace | 1.5 |
| On U.S. No. 230 | Trace | 2 | 2 | 4.5 |
| On U.S. No. 325 | 6.5 | 8 | 8 | 15.0 |

[1]Standard Screen Sizes

The embodiments of the invention in which an exclusive property or privilege is claimed are defined as follows:

1. A process for preparing a powdered sugar blend which comprises simultaneously grinding dextrose monohydrate and granular sucrose in a weight ratio, respectively, of about 1:99 to 50:50 to yield the blend wherein no more than about 1.5% of the particles thereof are retained on a U.S. No. 200 Standard Screen.

2. The process of claim 1 wherein the weight ratio of dextrose monohydrate to sucrose is between about 20:80 and 50:50.

3. The process of claim 1 wherein the weight ratio of dextrose monohydrate to sucrose is between about 1:99 and 35:65.

4. The process of claim 1 wherein wheat or corn starch is added prior to grinding at a level of about 1 to 5% by weight based on the weight of the blend of dextrose monohydrate and sucrose.

5. The powdered sugar blend produced by the process of claim 1.

* * * * *